US009933773B2

(12) United States Patent
Shimizu et al.

(10) Patent No.: US 9,933,773 B2
(45) Date of Patent: Apr. 3, 2018

(54) MONITORING DEVICE FOR PROGRAMMABLE CONTROLLER

(71) Applicants: JTEKT CORPORATION, Osaka-shi (JP); TOYOTA JIDOSHA KABUSHIKI KAISHA, Toyota-shi (JP)

(72) Inventors: Akihiro Shimizu, Kariya (JP); Terukazu Senda, Obu (JP); Masanori Muramatsu, Kariya (JP); Kouji Hamakawa, Miyoshi (JP); Kenzou Mima, Toyota (JP); Kouji Yamashiro, Miyoshi (JP)

(73) Assignees: JTEKT CORPORATION, Osaka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 282 days.

(21) Appl. No.: 14/991,505

(22) Filed: Jan. 8, 2016

(65) Prior Publication Data
US 2016/0202683 A1 Jul. 14, 2016

(30) Foreign Application Priority Data

Jan. 9, 2015 (JP) .................................. 2015-003649

(51) Int. Cl.
*G05B 19/048* (2006.01)
*G05B 19/05* (2006.01)

(52) U.S. Cl.
CPC ......... *G05B 19/048* (2013.01); *G05B 19/056* (2013.01); *G05B 2219/14107* (2013.01);
(Continued)

(58) Field of Classification Search
CPC ................ G05B 19/048; G05B 19/056; G05B 2219/14107; G05B 2219/14115; G05B 2219/24015; G05B 2219/24139
(Continued)

(56) References Cited

U.S. PATENT DOCUMENTS 7,505,875 B2 * 3/2009 Jinzenji ................ G05B 19/052
340/521
7,672,738 B2 * 3/2010 Ward ..................... G05B 19/07
326/40
(Continued)

FOREIGN PATENT DOCUMENTS

JP 2008-97079 4/2008

*Primary Examiner* — Chun Cao
(74) *Attorney, Agent, or Firm* — Oblon, McClelland, Maier & Neustadt, L.L.P.

(57) ABSTRACT

A monitoring device for a programmable controller includes: a display portion configured to display, on a display, a step that is being executed by the programmable controller among a plurality of steps in such a manner that the step can be distinguished from the other steps; a receiving portion configured to receive selection of a step serving as an initial point of reactivation in a case where a facility stops during a continuous operation by the programmable controller; and a change instruction generation portion configured to generate an instruction to the programmable controller so as to cause the programmable controller to restart execution of control processes from the step received by the receiving portion at the time of the reactivation.

5 Claims, 8 Drawing Sheets

(52) U.S. Cl.
CPC ............... *G05B 2219/14115* (2013.01); *G05B 2219/24015* (2013.01); *G05B 2219/24139* (2013.01)

(58) Field of Classification Search
USPC .......................................................... 700/26
See application file for complete search history.

(56) References Cited

U.S. PATENT DOCUMENTS

| | | | | |
|---|---|---|---|---|
| 8,374,718 B2* | 2/2013 | Takahashi | .......... | G05B 19/4069 318/568.15 |
| 8,600,542 B2* | 12/2013 | Fujishima | .......... | G05B 19/4067 700/177 |
| 2006/0149411 A1* | 7/2006 | Kochiya | ............ | G05B 19/4067 700/160 |
| 2014/0280528 A1* | 9/2014 | Brandes | ................ | G06F 15/177 709/204 |

* cited by examiner

F I G . 2
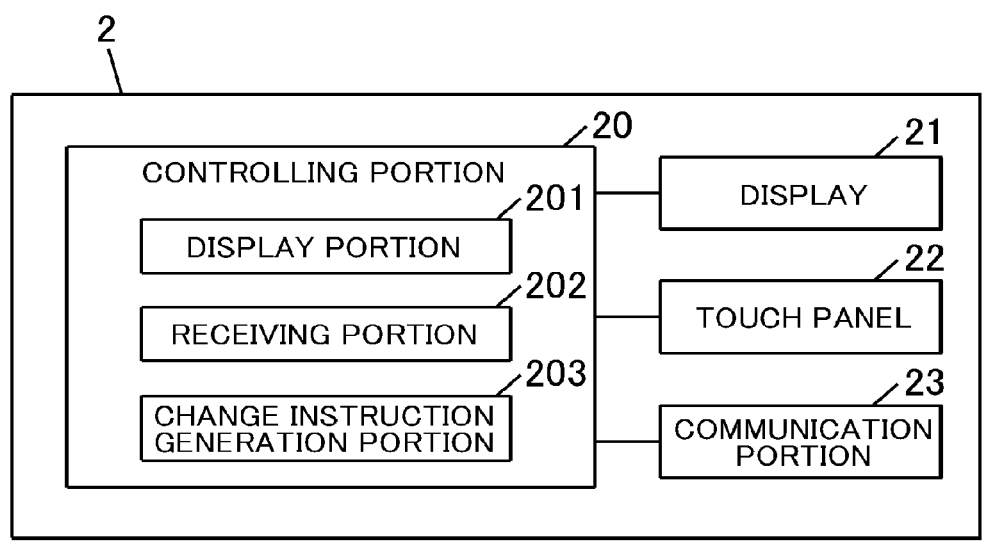

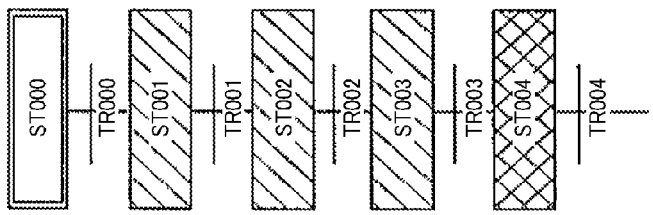

F I G . 7
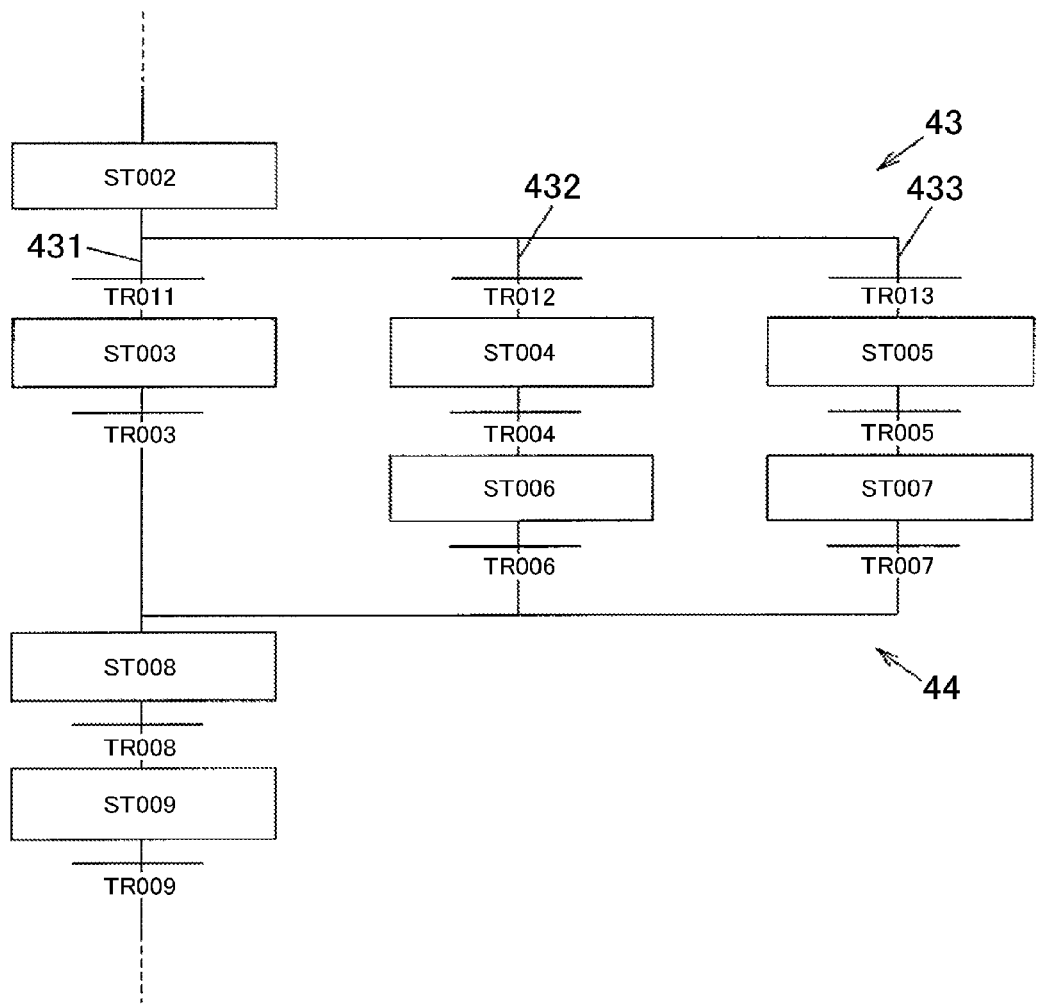

MONITORING DEVICE FOR PROGRAMMABLE CONTROLLER

INCORPORATION BY REFERENCE

The disclosure of Japanese Patent Application No. 2015-003649 filed on Jan. 9, 2015 including the specification, drawings and abstract is incorporated herein by reference in its entirety.

BACKGROUND OF THE INVENTION

1. Field of the Invention

The present invention relates to a monitoring device for a programmable controller, the monitoring device being configured to display an operation state of the programmable controller that executes a program described to include a plurality of steps each indicative of an individual control process and a transition indicative of a transition condition between the plurality of steps.

2. Description of Related Art

Conventionally, as a programming language for a programmable controller that controls a facility such as a machine tool, a ladder logic (a ladder language), a sequential function chart (a SFC language), a function block diagram (a FBD language), and the like have been known, as prescribed in the IEC61131-3 standard. Among them, the SFC language is a format that describes a flow of an individual control process like a flowchart. Since the SFC language has high clarity, the SFC language has been widely used in recent years.

In the meantime, a program described by the SFC language is described on the presumption that a plurality of steps each indicative of an individual control process is executed sequentially from the top. Accordingly, in a case where execution of the program described by the SFC language stops halfway due to some troubles while a programmable controller is executing the program described by the SFC language, it is difficult to restart the control processes from a step at which the troubles occur, at the time of reactivation after troubleshooting.

In view of such problems, the applicant of the present application has proposed a programmable controller that can appropriately reactivate a program described by the SFC language after the program stops halfway (see Japanese Patent Application Publication No. 2008-97079 (JP 2008-97079 A)).

However, the programmable controller described in JP 2008-97079 A assigns a ladder program described by the ladder language to each transition indicative of a transition condition between steps, and the ladder program is constituted by combining a halfway activation flag that is turned on when the ladder program is reactivated, an activation condition of a step just before each transition, and the like. Therefore, it takes time for a programming operation of the ladder program. Further, depending on a content of the troubleshooting, it may be necessary to restart the control processes from a step different from the step at which the troubles occur. However, in such a case, it is difficult to restart the control processes from a given step. Thus, the programmable controller described in JP 2008-97079 A left room for improvement.

SUMMARY OF THE INVENTION

The present invention provides a monitoring device for a programmable controller, the monitoring device being configured to display an operation state of the programmable controller that executes a program described by a SFC language and the monitoring device being able to set, by selection by an operator, a step from which control processes are restarted, at the time when troubles occur.

An aspect of the present invention relates to a monitoring device for a programmable controller, the monitoring device being configured to display, on a display device, an operation state of the programmable controller configured to execute a program described to include a plurality of steps each indicative of an individual control process and a transition indicative of a transition condition between the plurality of steps. The monitoring device includes: a display portion configured to read states of execution flags stored in the programmable controller as flags indicative of respective execution states of the plurality of steps and to display, on the display device, a step that is being executed by the programmable controller among the plurality of steps in such a manner that the step is distinguishable from the other steps; a receiving portion configured to receive selection of a step serving as an initial point of reactivation from among the plurality of steps in a case where halfway stop occurs during a continuous operation in which control processes of the plurality of steps are continuously executed by the programmable controller from an upstream side to a downstream side; and a change instruction generation portion configured to generate, to the programmable controller, a change instruction to change the states of the execution flags in order to cause the programmable controller to restart the execution of the control processes from the step received by the receiving portion, at the time of the reactivation.

According to the above aspect, when troubles occur during the operation of the programmable controller configured to execute a program described by a SFC language, a step from which execution of control processes is restarted can be set by selection by an operator.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a block diagram illustrating a functional configuration of the monitoring device;

FIG. 4A is an explanatory view illustrating changes of execution flags and execution completion flags together with the SFC program;

FIG. 4B is an explanatory view illustrating the changes of the execution flags and the execution completion flags together with the SFC program;

FIG. 4C is an explanatory view illustrating the changes of the execution flags and the execution completion flags together with the SFC program;

FIG. 7 illustrates an example of a SFC program including a selective branch circuit that can selectively execute control processes of a plurality of steps and a second merged circuit that merges execution process paths for the plurality of steps, the execution process paths being branched by the selective branch circuit;

DETAILED DESCRIPTION OF EMBODIMENTS

The following describes a first embodiment of the present invention with reference to FIGS. 1 to 7. Note that the embodiment described below indicates one preferred concrete example on performing the present invention. There are some parts that specifically exemplify various technical matters that are technically preferable, but a technical scope of the present invention is not limited to such concrete examples.

Figure 1:
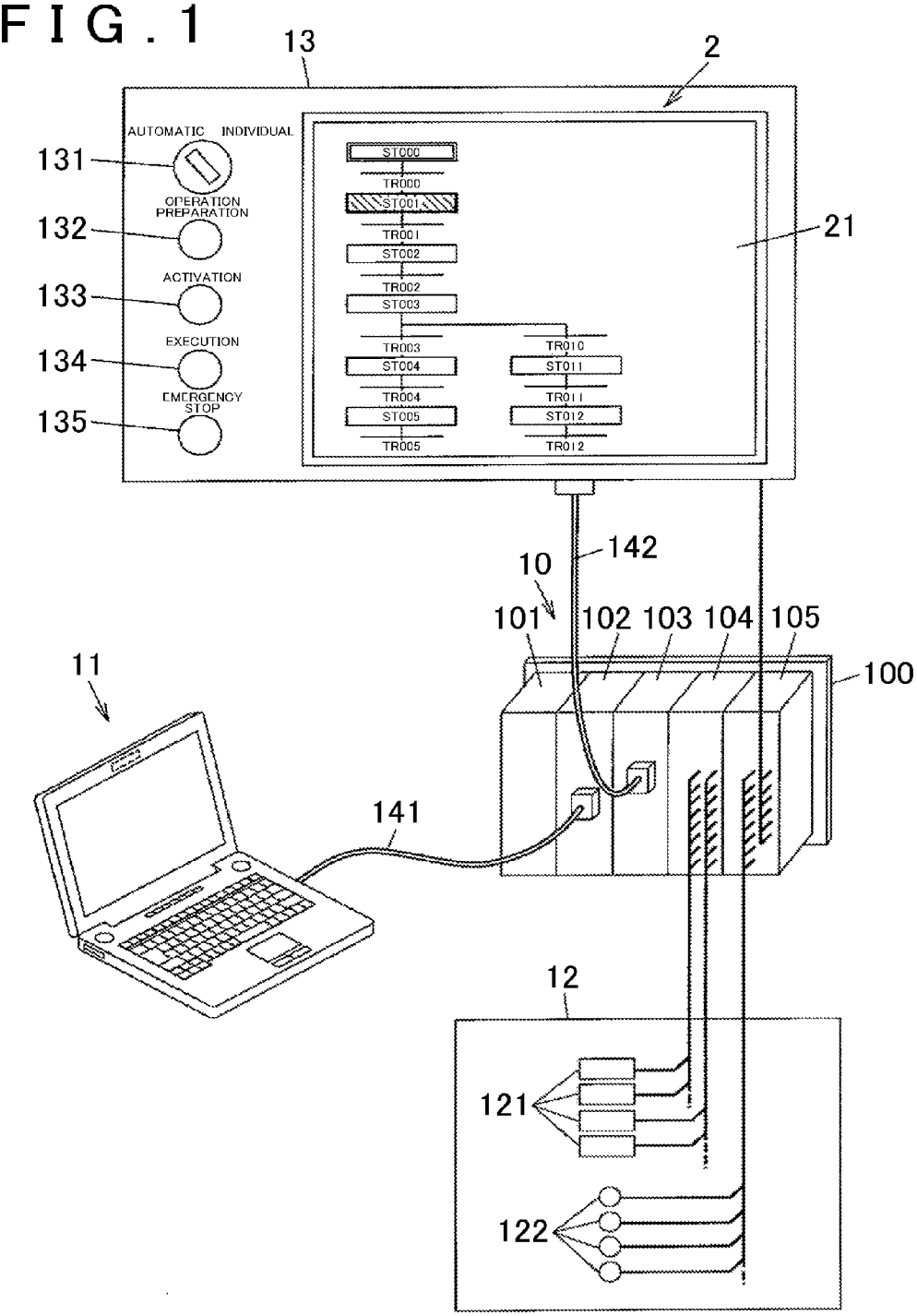
FIG. 1 is a configuration diagram illustrating an operating panel having a monitoring device for a programmable controller, according to a first embodiment of the present invention, together with a programmable controller, an operation program editing device, and a control target facility.

FIG. 1 is a configuration diagram illustrating an operating panel 13 having a monitoring device 2 for a programmable controller, according to the first embodiment of the present invention, together with a programmable controller 10, an operation program editing device 11, and a control target facility 12.

The programmable controller 10 is constituted by a power supply module 101, a CPU module 102, a communication module 103, an output module 104, an input module 105, and a base 100 on which these modules are mounted. The power supply module 101 supplies power supplies to the CPU module 102 and so on via the base 100. The communication module 103 performs communication with the monitoring device 2 provided in the operating panel 13.

The output module 104 has a plurality of output contact points connected to a plurality of actuators 121 provided in the facility 12. The plurality of actuators 121 is constituted by a solenoid, a motor, an electromagnetic selector valve that controls a hydraulic pressure, or the like, for example. The input module 105 has a plurality of input contact points connected to a plurality of sensors 122 provided in the facility 12. The plurality of sensors 122 is constituted by a proximity sensor, a photoelectronic sensor, a limit switch, or the like, for example.

The CPU module 102 executes an operation program edited by the operation program editing device 11 to turn on/off each of the output contact points of the output module 104 according to a state or the like of each of the input contact points of the input module 105, thereby controlling the facility 12. In the present embodiment, the facility 12 is a machine tool, and in a state where a workpiece carried therein is clamped, the facility 12 performs a predetermined machining operation such as cutting or grinding.

The operation program editing device 11 is constituted by an information processor provided with a display screen. In the present embodiment, the operation program editing device 11 is constituted by a handheld computer (a notebook computer). The operation program editing device 11 has a function to edit an operation program executed by the programmable controller 10, and a function to transfer the operation program thus edited to the CPU module 102 of the programmable controller 10 via a communication cable 141. The operation program is one aspect of a "program" of the present invention, and constituted by a SFC program described by a SFC language, and a ladder program described by a ladder language and assigned to each step and each transition (described later) of the SFC program.

Further, the CPU module 102 stores execution flags indicative of respective execution states of the plurality of steps of the SFC program, and executes the SFC program by referring to ON/OFF of the execution flags. Note that, even in a case where the power supply of the programmable controller 10 is stopped during execution of the SFC program by the CPU module 102, when the power supply is turned on after that, ON/OFF states of the execution flags are maintained in a state before the power supply is stopped.

The operating panel 13 includes the monitoring device 2, an automatic/individual selecting switch 131, an operation preparation switch 132, an activation switch 133, an execution switch 134, and an emergency stop switch 135. The automatic/individual selecting switch 131 is an alternative select switch, and the operation preparation switch 132, the activation switch 133, the execution switch 134, and the emergency stop switch 135 are push button switches.

The automatic/individual selecting switch 131 is a switch that switches between an automatic operation mode in which the programmable controller 10 performs a continuous operation according to the operation program edited by the operation program editing device 11, and an individual operation mode in which the actuators 121 of the facility 12 are caused to perform individual operations. The operation preparation switch 132 is a switch that allows the actuators 121 of the facility 12 to operate. The activation switch 133 is a switch that instructs activation of an automatic operation. The execution switch 134 is a switch that instructs execution of the individual operations in the individual operation mode or the like. The emergency stop switch 135 is a switch that immediately stops the operation of the facility 12. These switches 131 to 135 are connected to the input module 105 of the programmable controller 10.

The monitoring device 2 is connected to the communication module 103 of the programmable controller 10 via a communication cable 142, so that the monitoring device 2 can read out, as needed, an ON/OFF state of each of the output contact points of the output module 104, an ON/OFF state of each of the input contact points of the input module 105, and ON/OFF states of various flags stored in the CPU module 102. Further, the monitoring device 2 can read out an operation program stored in the CPU module 102, from the programmable controller 10. The monitoring device 2 displays, on the display 21, an execution state of the operation program by the CPU module 102 of the programmable controller 10 as needed.

The SFC program edited by the operation program editing device 11 is described to include a plurality of steps each indicative of an individual control process, and a transition indicative of a transition condition between the plurality of steps.

The monitoring device 2 displays, on the display 21, a step that is being executed by the CPU module 102 and its previous and subsequent steps, so as to display an operation state of the programmable controller 10. At this time, the monitoring device 2 displays the step that is being executed by the CPU module 102 so that the step can be distinguished from the other steps by using different display colors, for example. In the example illustrated in FIG. 1, the step that is being executed by the CPU module 102 is indicated by hatching.

An operator such as a person in charge of maintenance who performs troubleshooting when troubles occur in the facility 12 can observe the operation state of the programmable controller 10 based on a display content on the display 21. When the facility 12 stops during an automatic operation, the operation state includes information indicative of during which step of the SFC program the facility 12 stops.

FIG. 2 is a block diagram illustrating a functional configuration of the monitoring device 2. The monitoring device 2 includes a controlling portion 20 including a MPU (microprocessing unit), a peripheral circuit, and so on; a display 21 serving as a display device; a touch panel 22; and a communication portion 23 for performing communication with the communication module 103 of the programmable controller 10. When the MPU executes a program stored in advance, the controlling portion 20 functions as a display portion 201, a receiving portion 202, and a change instruction generation portion 203. A function embodied by each of these portions will be described later.

The display 21 is a liquid crystal display or a plasma display, for example, and displays an image on a display screen based on an image signal output from the controlling portion 20. The touch panel 22 is configured such that many touch sensor elements are placed on a sheet-like substrate made of resin and having a light-transmitting property. The touch panel 22 is put on the display screen of the display 21. When the operator touches the touch panel 22, the controlling portion 20 can recognize a contact position thereof based on detection signals from the touch sensor elements. The communication portion 23 performs communication with the communication module 103 of the programmable controller 10 according to a protocol of Ethernet (registered trademark), for example.

The display portion 201 displays, on the display 21, a plurality of steps including a step that is being executed by the programmable controller 10 and its previous and subsequent steps, among the plurality of steps of the SFC program read from the programmable controller 10 via the communication portion 23. More specifically, the display portion 201 reads state of execution flags stored in the programmable controller 10 as flags indicative of respective execution states of the plurality of steps of the SFC program. Then, the display portion 201 finds a step that is being executed by the programmable controller 10 based on the states of the execution flags thus read, and displays the step that is being executed on the display 21 in such a manner that the step can be distinguished from the other steps.

At the time of halfway stop during a continuous operation in which control processes of the plurality of steps are continuously executed by the programmable controller 10 from an upstream side to a downstream side, the receiving portion 202 receives selection of a step serving as an initial point of reactivation from among the plurality of steps. This selection is performed such that the operator touches the touch panel 22 in an area corresponding to a display area of one of the plurality of steps displayed on the display 21 (hereinafter, this operation is referred to as a "touch operation").

At the time of reactivation after the halfway stop, in order to restart the execution of the control processes from the step received by the receiving portion 202, the change instruction generation portion 203 generates a change instruction, to the programmable controller 10, to change states of execution flag. The change instruction is sent to the programmable controller 10 by the communication portion 23. The CPU module 102 of the programmable controller 10 changes the state of the execution flag upon receipt of the change instruction.

Figure 3:
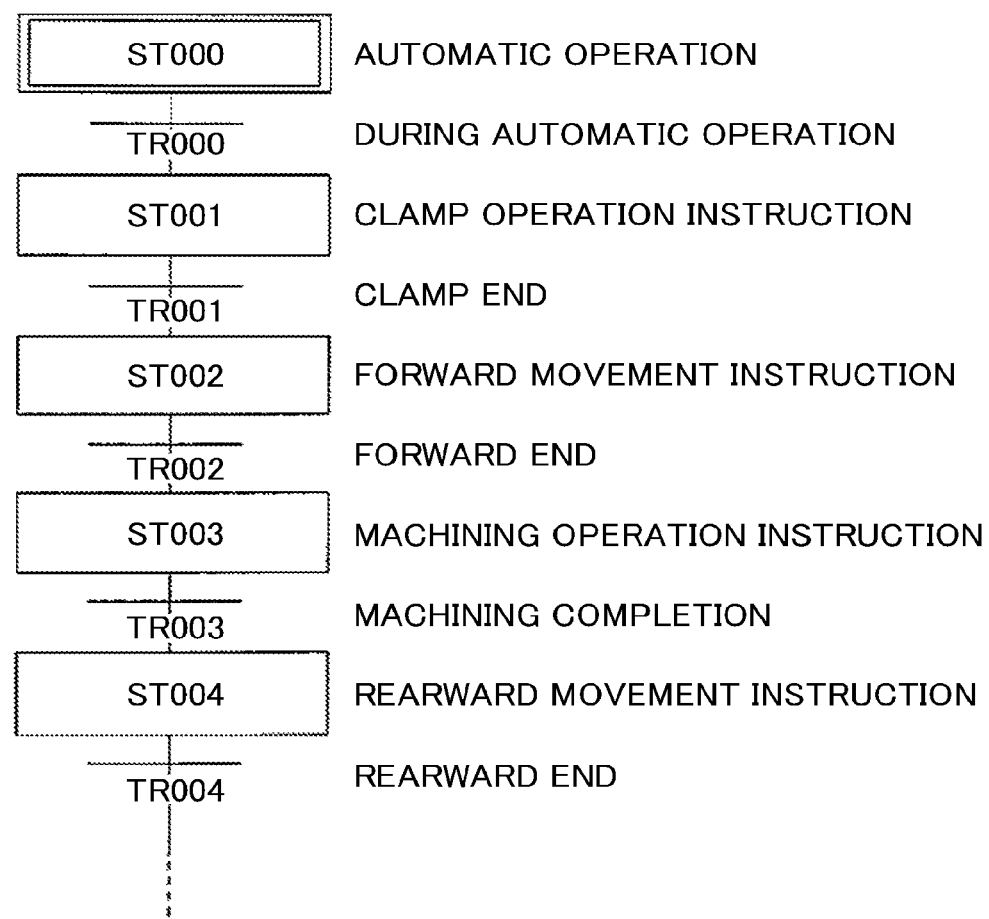
FIG. 3 illustrates one example of a SFC program executed by the programmable controller.

FIG. 3 illustrates one example of the SFC program executed by the programmable controller 10. The SFC program is described in accordance with the IEC61131-3 standard such that a plurality of steps each indicative of an individual control process, and a transition indicative of a transition condition between the steps are described alternately. An initial step "ST000" of the SFC program is a step indicative of an automatic operation. At the start of the automatic operation, the programmable controller 10 sequentially executes control processes of respective steps from "ST000" corresponding to an uppermost stream of the SFC program toward a downstream side.

The SFC program illustrated in FIG. 3 is configured to sequentially execute the control processes of respective steps of a clamp operation instruction (ST001), a forward movement instruction (ST002), a machining operation instruction (ST003), and a rearward movement instruction (ST004).

In order to execute the process of the step of the forward movement instruction (ST002) after the control process of the step of the clamp operation instruction (ST001) is executed, it is necessary to pass a transition "TR001." The step of the forward movement instruction (ST002) is one downstream step after the step of the clam operation instruction (ST001). A transition condition of the transition "TR001" is a "clamp end." Accordingly, for example, when the input module 105 receives, from the sensor 122, a signal indicating that a damper for clamping a workpiece moves to the clamp end in the facility 12, the transition condition is satisfied, so that the transition "TR001" can be passed. Hereby, the programmable controller 10 executes the forward movement instruction (ST002), which is a step right under the transition "TR001." The forward movement instruction is an instruction of an operation of moving forward a machining device toward the workpiece. Similarly, when a transition condition of each transition (TR002, TR003, TR004) is satisfied, a control process of one downstream step after the each transition is executed.

A ladder program is assigned to each of the steps and the transitions. The ladder program assigned to each of the steps is a program for turning on each of the output contact points of the output module 104 which are connected to the actuators 121 of the facility 12, under a predetermined condition. The predetermined condition includes various interlock signals or the like that ensure the safety of the operation of the facility 12. The ladder program assigned to each of the transitions includes the input contact points of the input module 105 which indicate that an operation of a control process of a step just before the each of the transitions is completed, and a transition condition to a subsequent step is set therein.

The CPU module 102 of the programmable controller 10 stores each of the execution states of these steps with an execution flag and an execution completion flag. Each of the steps is provided with the execution flag and the execution completion flag. The execution flag is a flag indicating that a transition condition of a transition right under its corresponding step is not satisfied and the programmable controller 10 is executing a control process of the corresponding step. The execution completion flag is a flag indicating that the programmable controller 10 has already executed a control process of its corresponding step after execution start of the SFC program from "ST000" on an uppermost stream side. Changes of the execution flag and the execution completion flag will be described more specifically with reference to FIG. 4.

FIGS. 4A to 4C are explanatory views each illustrating changes of the execution flag and the execution completion flag together with the SFC program. In FIGS. 4A to 4C, a step that is being executed by the programmable controller 10 is indicated by cross hatching, and a step that has been already executed by the programmable controller 10 is indicated by hatching. Further, in FIGS. 4A to 4C, states (ON: 1, OFF: 0) of an execution flag and an execution completion flag corresponding to each step are illustrated side by side on a left side of the each step.

FIG. 4A illustrates a state where the programmable controller 10 has completed execution of a control process of a step "ST001" and is in the middle of execution of a control process of a step "ST002." In this state, an execution flag of the step "ST002" is 1 (ON), and execution flags of the other steps are 0 (OFF). Further, an execution completion flag of the step "ST001" and an execution completion flag of a step on the upstream side relative to the step "ST001" are 1 (ON), and execution completion flags of steps on the downstream side relative to the step "ST001" are 0 (OFF).

When a transition condition of a transition TR002 is satisfied from the state illustrated in FIG. 4A, the programmable controller 10 executes a control process of a step "ST003." At this time, as illustrated in FIG. 4B, an execution flag of a step "ST003" is turned into 1 (ON), and the execution flag of the step "ST002" is turned into 0 (OFF). Further, an execution completion flag of the step "ST002" is turned into 1 (ON).

Furthermore, when a transition condition of a transition TR003 is satisfied from the state illustrated in FIG. 4B, the programmable controller 10 executes a control process of a step "ST004." At this time, an execution flag of a step "ST004" is turned into 1 (ON), the execution flag of the step "ST003" is turned into 0 (OFF), and an execution completion flag of the step "ST003" is turned into 1 (ON).

On the display 21 of the monitoring device 2, a step with an execution completion flag of 1 (ON) is displayed in green background color, for example, and a step with an execution flag of 1 (ON) is displayed in orange background color, for example. In this case, as the control processes of respective steps are executed along the SFC program, a step displayed in orange sequentially moves toward the downstream side, and the number of steps displayed in green background color increases gradually.

As described above, even in a case where the power supply of the programmable controller 10 is stopped, ON/OFF states of the execution flags and the execution completion flags are maintained. When the power supply of the programmable controller 10 is turned on again and activation of the automatic operation is instructed by the automatic/individual selecting switch 131 and the activation switch 133, the execution of the control processes is restarted from a step with an execution flag of 1 (ON).

In the meantime, the facility 12 may stop halfway due to various factors during the automatic operation. For example, in a case where a cutting tool for use in machining on the workpiece is damaged during the machining of the workpiece by the machining operation instruction (ST003) and the machining cannot be completed, the transition condition of the transition "TR003" is not satisfied, so that the facility 12 stops halfway. In such a case, the operator checks during which step the facility 12 stops halfway based on a display content of the display 21 of the monitoring device 2, and switches the automatic/individual selecting switch 131 to the individual operation mode so as to operate the facility 12 by an individual operation, so that troubleshooting such as replacement of the cutting tool is performable. In this state, the cutting tool is replaced by stopping the power supplies of the programmable controller 10 and the facility 12 so as to secure the safety.

The individual operation individually operates the actuators 121 of the facility 12 in the individual operation mode. When the operator selects an individual button displayed on the display 21 of the monitoring device 2 and performs a push operation on the execution switch 134, an actuator 121 corresponding to the selected individual button operates. For example, in a case where troubles occur during the machining of the workpiece as described above, an individual button of a "rearward movement instruction" to regress the machining device provided with the cutting tool from the workpiece is selected, and then, a push operation is performed on the execution switch 134, so that the machining device backs away. In this state, replacement of the cutting tool or the like can be performed.

After that, the operator further turns on the power supplies of the programmable controller 10 and the facility 12 again, and switches the automatic/individual selecting switch 131 to the automatic operation mode to perform a push operation on the activation switch 133, so as to restart the automatic operation of the facility 12.

At this time, depending on a content of the troubleshooting performed by the operator, it may be necessary to restart the automatic operation from a step different from the machining operation instruction (ST003). For example, in a case where the machining device is backed away at the time of replacing the cutting tool, it is necessary to restart the automatic operation from the step (ST002) of the forward movement instruction. Further, in a case where a tip end of the cutting tool is broken and remains in the workpiece, it is necessary to move away the workpiece without performing the machining. In this case, it is necessary to restart the automatic operation from the step (ST004) of the rearward movement instruction, for example.

Conventionally, at the time of restarting the automatic operation after such halfway stop, the operator has not been able to select a step serving as an initial point of reactivation, that is, a step to be executed first at the time of restarting the automatic operation, from among steps displayed on the display 21 of the monitoring device 2. However, in the present embodiment, the controlling portion 20 functions as the receiving portion 202 and the change instruction generation portion 203, so that a step from which the execution of the control processes is restarted can be set by the selection of the operator. The following more specifically describes a concrete example of a process to be executed by the controlling portion 20 as the receiving portion 202 and the change instruction generation portion 203, with reference to FIG. 5.

Figure 5A:
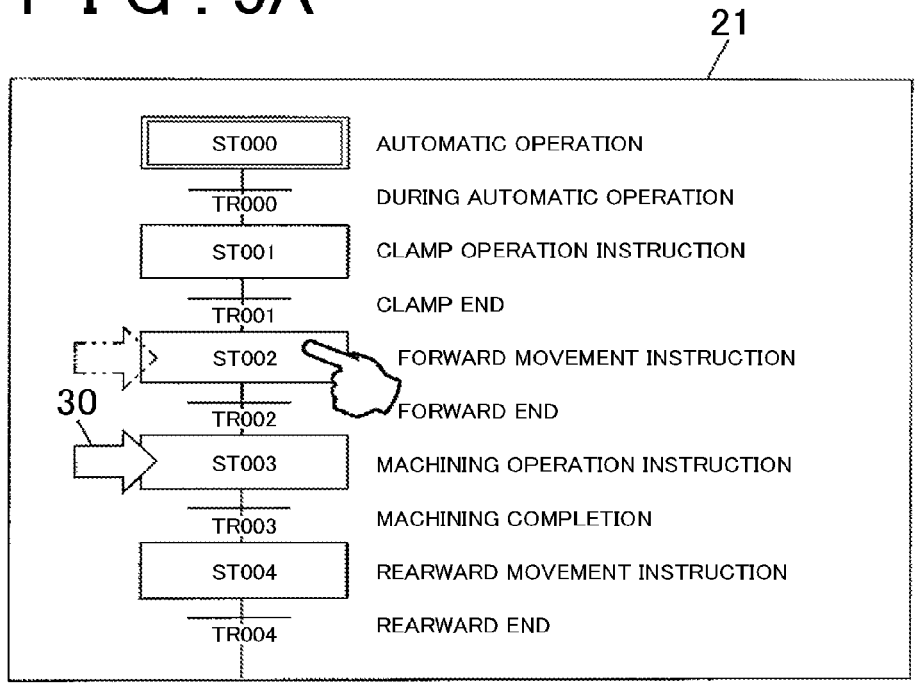
FIG. 5A illustrates a display example of a display at the time when power supplies of the programmable controller and the monitoring device are turned on again.

FIG. 5A illustrates a display content of the display 21 at the time when troubles occur during execution of the step "ST003" of the SFC program illustrated in FIG. 3 and the operator performs troubleshooting and then turns on the power supply of the programmable controller 10. In this state, it is assumed that reactivation is not performed, and the automatic/individual selecting switch 131 is set to the individual operation mode.

In the above aspect, on the display screen of the display 21, a symbol mark 30 indicative of a reactivation position is displayed with respect to the step "ST003" with an execution flag of 1 (ON). In the example illustrated in FIG. 5A, the symbol mark 30 has an arrow shape and is displayed to partially overlap with the step "ST003." In this state, when the operator performs a touch operation on the step "ST002" on the display 21, a first dialog screen is displayed on the display screen of the display 21.

Figure 5B:
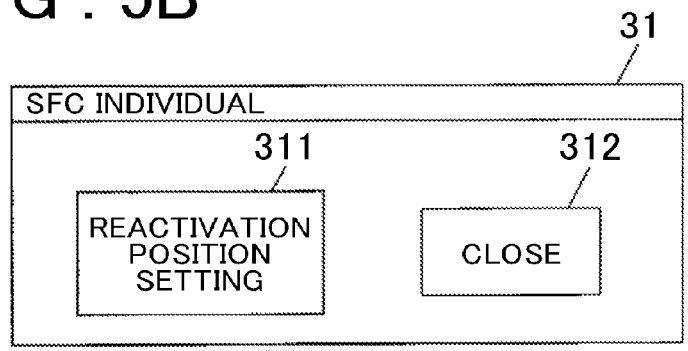
FIG. 5B illustrates a first dialog screen displayed at the time when an operator performs a touch operation on a display area of a step "ST002" on the display.

FIG. 5B illustrates the first dialog screen 31 displayed at the time when the operator performs a touch operation on the step "ST002" on the display 21. On the first dialog screen 31, a reactivation position setting button 311 for setting the step "ST002" thus subjected to the touch operation as an initial point of reactivation, and a close button 312 for closing the dialog screen 31 are displayed. When the step "ST002" is set as the initial point of the reactivation, the operator performs a touch operation on the reactivation position setting button 311 In response to this, a second dialog screen for confirming the operation is displayed on the display screen of the display 21.

Figure 5C:
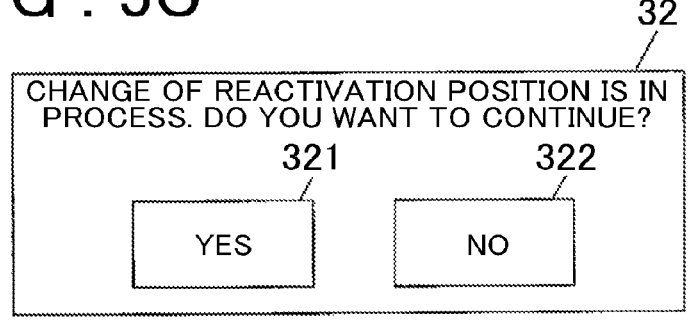
FIG. 5C illustrates a second dialog screen 32 displayed at the time when the operator performs a touch operation on a reactivation position setting button of the first dialog screen.

FIG. 5C illustrates the second dialog screen 32 displayed at the time when the operator performs a touch operation on the reactivation position setting button 311 on the first dialog screen 31. On the second dialog screen 32, a Yes button 321 for confirming the step "ST002" thus subjected to the touch operation by the operator, as the initial point of the reactivation, and a No button 322 for invalidating the touch operation on the step "ST002" are displayed, together with a message that calls an operator's attention. Then, when the operator performs a touch operation on the Yes button 321, the selection by the operation to set the step "ST002" as the initial point of the reactivation is confirmed. That is, the step "ST002" is received as a step serving as the initial point of the reactivation.

In the meantime, when a touch operation is performed on the close button 312 on the first dialog screen 31 or when a touch operation is performed on the No button 322 on the second dialog screen 32, the touch operation on the step "ST002" by the operator is canceled.

A series of these processes, that is, a process of receiving the touch operation on the step "ST002" to display the first dialog screen 31 and receiving the touch operation on the reactivation position setting button 311 or the close button 312 and a process of receiving the touch operation on the Yes button 321 or the No button 322 by displaying the second dialog screen 32 is a process executed by the controlling portion 20 as the receiving portion 202.

When the step "ST002" is received as the step serving as the initial point of the reactivation, the controlling portion 20 generates a change instruction to change states of execution flags, with respect to the programmable controller 10. A specific content of the change instruction is an instruction to turn the execution flag of the step "ST002" into 1 (ON) and to turn the execution flag of the step "ST003" into 0 (OFF). The process is a process executed by the controlling portion 20 as the change instruction generation portion 203.

Hereby, the display position of the symbol mark 30 illustrated in FIG. 5A moves to a position corresponding to the step "ST002." In FIG. 5A, the symbol mark 30 after the movement is indicated by an alternate long and two short dashes line.

After the display position of the symbol mark 30 moves to the position corresponding to the step "ST002," the operator sets the automatic/individual selecting switch 131 to the automatic operation mode and performs an push operation on the activation switch 133. Hereby, the programmable controller 10 restarts the automatic operation from the step "ST002" with an execution flag of 1 (ON).

Note that the above description specifically describes a case where the automatic operation is restarted from the step "ST002," which is a step on the upstream side relative to the step (the step "ST003") at which troubles occur. However, it is also possible to select a step (e.g., the step "ST004") on the downstream side relative to the step at which troubles occur, as the initial point of the reactivation. In this case, a change instruction to turn the execution flag of the step "ST004" into 1 (ON) and to turn the execution flag of the step "ST003" into 0 (OFF) is generated from the controlling portion 20 with respect to the programmable controller 10.

Subsequently, the following describes reactivation in a case where the SFC program includes branches, with reference to FIGS. 6 and 7. A branch circuit usable in the SFC program includes a parallel branch circuit and a selective branch circuit to be described below.

Figure 6:
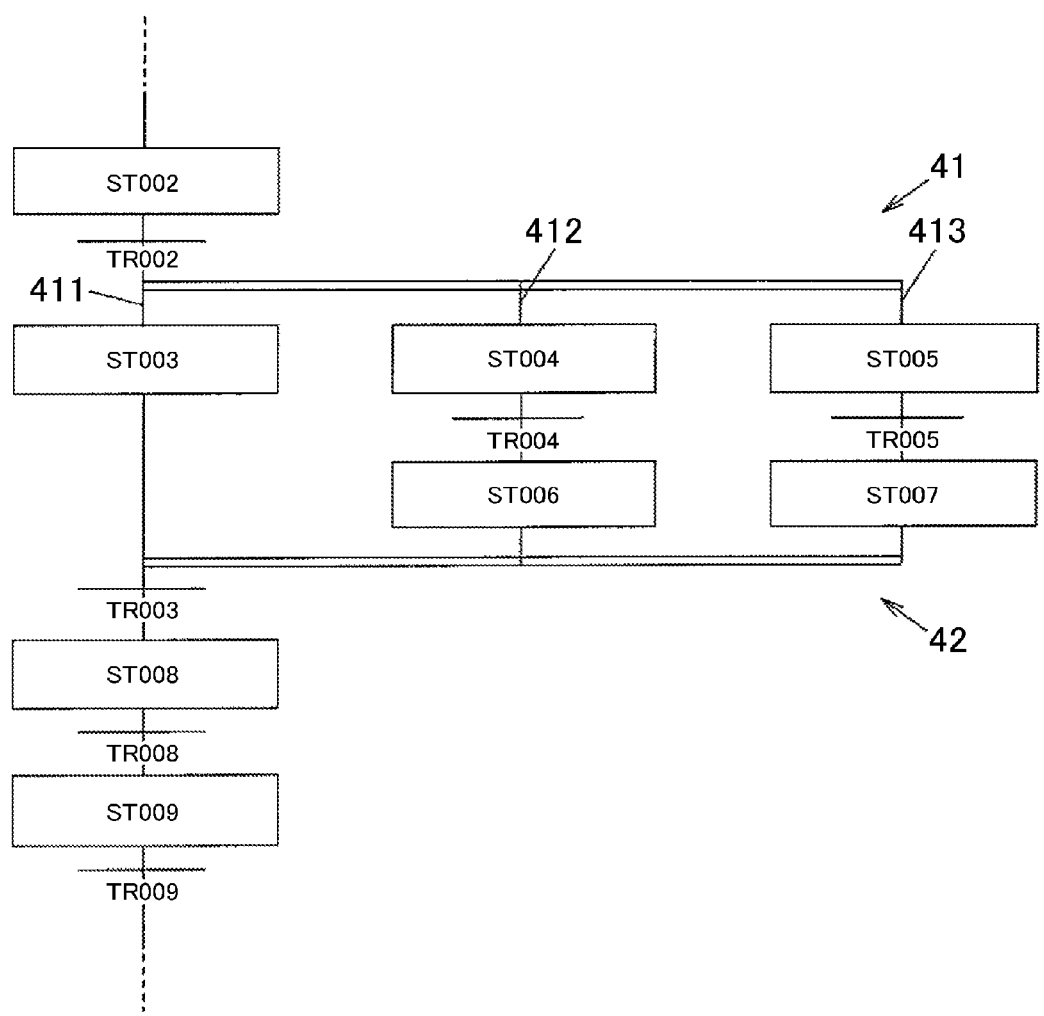
FIG. 6 illustrates an example of a SFC program including a parallel branch circuit that can execute control processes of a plurality of steps in parallel and a first merged circuit that merges execution process paths for the plurality of steps, the execution process paths being branched by the parallel branch circuit.

FIG. 6 illustrates an example of a SFC program including a parallel branch circuit 41 that can execute control processes of a plurality of steps in parallel and a first merged circuit 42 that merges execution process paths for the plurality of steps, the execution process paths being branched by the parallel branch circuit 41.

In the SFC program, after the step "ST002" is executed, the execution process path for the steps is branched by the parallel branch circuit 41 into a first execution process path 411 constituted by a step "ST003," a second execution process path 412 constituted by a step "ST004" and a step "ST006," and a third execution process path 413 constituted by a step "ST005" and a step "ST007." Control processes of respective steps of the first to third execution process paths 411 to 413 are performed in parallel.

In the SFC program including the parallel branch circuit 41 and the first merged circuit 42, in a case where troubles occur in a step on the upstream side relative to the parallel branch circuit 41 and one step between the parallel branch circuit 41 and the first merged circuit 42 is selected as the initial point of the reactivation, when only steps on the downstream side relative to the step thus selected is executed, control processes of some of the other steps between the parallel branch circuit 41 and the first merged circuit 42 may not be performed.

For example, in a case where troubles occur in a step "ST002" of the SFC program illustrated in FIG. 6 and the automatic operation of the facility 12 stops, when a step "ST004" included in the second execution process path 412 is selected as the initial point of the reactivation and a transition condition of a transition "TR004" is satisfied, a control process of a step "ST006" is executed. However, control processes of steps (steps "ST003", "ST005", "ST007") of the other execution process paths (the first execution process path 411 and the third execution process path 413) are not executed, so they remain incomplete.

In view of this, in the present embodiment, in a case where the automatic operation of the facility 12 stops halfway on the upstream side relative to the parallel branch circuit 41 and a step received by the receiving portion 202 is included in any of the plurality of execution process paths (the first to third execution process paths 411 to 413) branched by the parallel branch circuit 41, the controlling portion 20 functions as the change instruction generation portion 203 and generates, to the programmable controller 10, a change instruction to change states of execution flags so as to execute, in addition to the step received by the receiving portion 202, control process of initial steps of the other execution process paths except the execution process path including the step received by the receiving portion 202, among the plurality of execution process paths branched by the parallel branch circuit 41.

More specifically, in a case where the step "ST004" included in the second execution process path 412 is selected by the receiving portion 202 as the step serving as the initial point of the reactivation, the controlling portion 20 functions as the change instruction generation portion 203 and generates, to the programmable controller 10, a change instruction to turn execution flags of the step "ST003" and the step "ST005" into 1 (ON), in addition to the step "ST004". The step "ST003" is an initial step among steps included in the first execution process path 411, and the step "ST005" is an initial step among steps included in the third execution process path 413.

Hereby, in a case where the SFC program includes the parallel branch circuit 41 and the first merged circuit 42 and troubles occur in a step on the upstream side relative to the parallel branch circuit 41, even if one step between the parallel branch circuit 41 and the first merged circuit 42 is selected as the step serving as the initial point of the reactivation, the automatic operation after the reactivation is performed appropriately.

FIG. 7 illustrates an example of a SFC program including a selective branch circuit 43 that can selectively execute control processes of a plurality of steps and a second merged circuit 44 that merges execution process paths for the plurality of steps, the execution process paths being branched by the selective branch circuit 43.

In the SFC program, after a step "ST002" is executed, the execution process path for the steps is branched by the selective branch circuit 43 into a first execution process path 431 constituted by a step "ST003," a second execution process path 432 constituted by steps "ST004" and "ST006," and a third execution process path 433 constituted by a step "ST005" and a step "ST007." A control process of the step "ST003" of the first execution process path 431 is executed when a transition condition of a transition "TR011" is satisfied. Control processes of the steps "ST004" and "ST006" of the second execution process path 432 are executed when a transition condition of a transition "TR012" is satisfied. Further, control processes of the steps "ST005" and "ST007" of the third execution process path 433 are executed when a transition condition of a transition "TR013" is satisfied.

These transitions "TR011," "TR012," "TR013" are constituents of the selective branch circuit 43. Whether or not the transition condition of the transition "TR012" is satisfied is determined in a case where the transition condition of the transition "TR011" is not satisfied, and whether or not the transition condition of the transition "TR013" is satisfied is determined in a case where the transition conditions of the transitions "TR011" and "TR012" are not satisfied. That is, in the SFC program, the determination on whether or not the transition condition is satisfied is performed preferentially on a transition described on a left side relative to the selective branch circuit 43.

In the SFC program including the selective branch circuit 43 and the second merged circuit 44, in a case where troubles occur in a step on the downstream side relative to the second merged circuit 44 and one step between the selective branch circuit 43 and the second merged circuit 44 is selected as the step serving as the initial point of the reactivation, when the step thus selected is a step included in an execution process path that is not selected before the occurrence of the troubles, a control process of a step that is not suitable for an actual state of the facility 12 is performed, so that the automatic operation might not be restarted appropriately.

For example, in the SFC program illustrated in FIG. 7, in a case where troubles occur in a step "ST008" on the downstream side relative to the second merged circuit 44 after the transition condition of the transition "TR011" of the selective branch circuit 43 is not satisfied but the transition condition of the transition "TR012" is satisfied, and the control processes of the steps "ST004" and "ST006" are executed, if the step "ST005" or "ST007" included in the third execution process path 433 is selected as the step serving as the initial point of the reactivation, the automatic operation after the reactivation is not performed appropriately.

In view of this, in the present embodiment, in a case where troubles occur in a step on the downstream side relative to the second merged circuit 44 and a continuous operation of a plurality of steps of the SFC program stops halfway, selection of a step that has not been executed before halfway stop occurs, from among a plurality of steps between the selective branch circuit 43 and the second merged circuit 44, is disallowed. Note that whether or not each step has been executed before the halfway stop can be determined based on a state of its execution completion flag.

This process is a process executed by the controlling portion 20 as the receiving portion 202. A specific measure to disallow the operator to perform the selection is as follows, for example: a text of "reactivation position setting" in the reactivation position setting button 311 on the first dialog screen 31 is displayed in gray, so that the second dialog screen 32 is not displayed even if a touch operation is performed on the reactivation position setting button 311. Alternatively, by displaying an error message on the display screen of the display 21, the operator may be notified that the step is not selectable as the step serving as the initial point of the reactivation.

Hereby, even in a case where the SFC program includes the selective branch circuit 43 and the second merged circuit 44 and troubles occur in a step on the downstream side relative to the second merged circuit 44, it is possible to prevent beforehand the operator from selecting an inappropriate step as the step serving as the initial point of the reactivation.

According to the first embodiment described above, it is possible to obtain the following operation/working-effects.

(1) The controlling portion 20 of the monitoring device 2 receives selection of a step serving as an initial point of reactivation by the operator, and generates, to the programmable controller 10, a change instruction to change states of execution flags to restart execution of control processes from the step thus selected, at the time of the reactivation. Accordingly, the automatic operation of the facility 12 is restarted from the step thus selected by the operator at the time of the reactivation. Further, at this time, an operation performed by the operator is only an operation of selecting the step serving the initial point of the reactivation, and the change instruction to change states of execution flags is automatically generated from the controlling portion 20, so a work load for the operator is not increased. That is, the operator can easily perform an operation of restarting the automatic operation of the facility 12 from a most suitable step according to a content of troubleshooting.

(2) In a case where the SFC program includes the parallel branch circuit 41 and the first merged circuit 42 and troubles occur in a step on the upstream side relative to the parallel branch circuit 41, even if one step between the parallel branch circuit 41 and the first merged circuit 42 is selected as the step serving as the initial point of the reactivation, the automatic operation after the reactivation is performed appropriately.

(3) Even in a case where the SFC program includes the selective branch circuit 43 and the second merged circuit 44 and troubles occur in a step on the downstream side relative to the second merged circuit 44, it is possible to prevent beforehand the operator from selecting an inappropriate step as the step serving as the initial point of the reactivation.

Next will be described a second embodiment of the present invention with reference to FIG. 8. The present embodiment is different from the first embodiment in that: an individual operation button configured to cause a programmable controller 10 to individually perform a control process of a step selected by an operator is added to a first dialog screen 31 as described above with reference to FIG. 5B in the first embodiment, and when a touch operation is performed on the individual operation button and a push operation is then performed on an execution switch 134, the programmable controller 10 is caused to execute a control process thereof; and when the control process is executed, it is regarded that a step that is one downstream step after the step selected by the operator is selected as a step serving as an initial point of reactivation.

Figure 8:
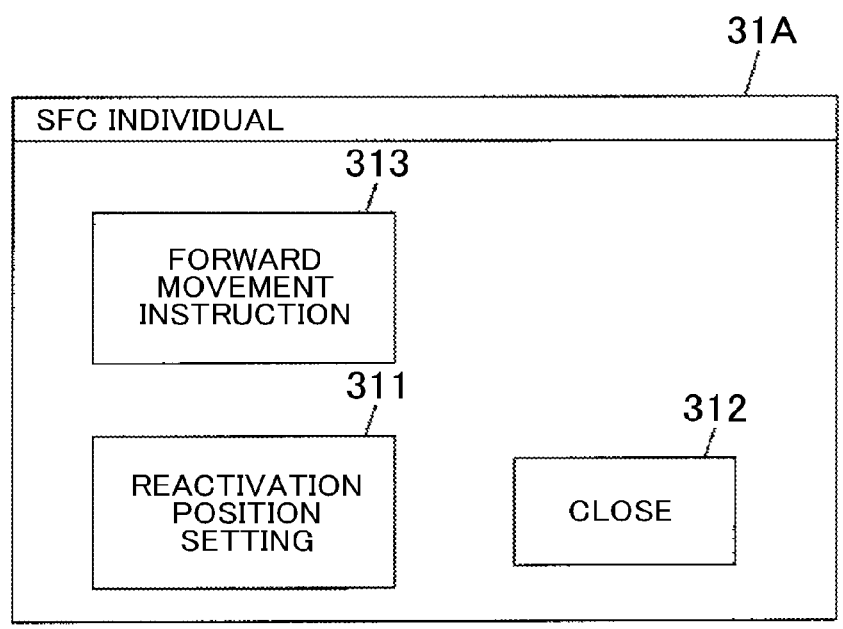
FIG. 8 illustrates a first dialog screen displayed on a display of a monitoring device according to a second embodiment of the present invention.

FIG. 8 illustrates a first dialog screen 31A displayed on a display 21 of a monitoring device 2 according to the present embodiment. The first dialog screen 31A is displayed in the following case: the operator performs troubleshooting at the time when troubles occur during an automatic operation of a facility 12 in which the programmable controller 10 continuously executes a SFC program as illustrated in FIG. 3; the operator turns on a power supply of the programmable controller 10 again; and after that, the operator performs a touch operation on a display area of a step "ST002" on the display 21.

On the first dialog screen 31A, an individual operation button 313 that causes the programmable controller 10 to execute a forward movement instruction, which is a control process of the step "ST002," is displayed in addition to a reactivation position setting button 311 and a close button 312 as described in the first embodiment. A display content of the individual operation button 313 includes a text string "forward movement instruction" indicative of a content of the control process of the step "ST002."

When the operator operates a touch operation on the individual operation button 313, a controlling portion 20 of a monitoring device 2 changes the display content of the individual operation button 313, so as to clearly notify the operator that the touch operation is received effectively. The change of the display content is performed by changing display color of the individual operation button 313, for example. Further, the controlling portion 20 sends, to the programmable controller 10, a signal indicating that the touch operation is performed on the individual operation button 313. These processes are processes executed by the controlling portion 20 as a receiving portion 202.

In this state, when the operator performs a push operation on an execution switch 134 of an operating panel 13, the forward movement instruction, which is a control process of the step "ST002," is executed by the programmable controller 10. More specifically, a ladder program assigned to the step "ST002" is executed by the programmable controller 10, so that a corresponding output contact point of an output module 104 enters an ON state. Note that, in the ladder program, an interlock that is necessary to ensure the safety of the operation of the facility 12 is formed.

When the control process of the step "ST002" is executed by the programmable controller 10 and a transition condition of a transition TR002 (see FIG. 3) right under the step "ST002" is satisfied, the facility 12 enters a state in which a control process of a step "ST003" (see FIG. 3), which is one downstream step after the step "ST002," is executable. In response to this, the controlling portion 20 functions as the receiving portion 202 and regards that the step "ST003" is selected as a step serving as an initial point of reactivation. Further, the controlling portion 20 functions as a change instruction generation portion 203 and generates, to the programmable controller 10, a change instruction to turn an execution flag of the step "ST003" into 1 (ON) and to turn an execution flag of the step "ST002" into 0 (OFF). Hereby, at the time of reactivation after halfway stop of the facility 12, execution of control processes by the programmable controller 10 is restarted from the step "ST003."

Note that, when a touch operation is performed on a reactivation position setting button 311 on the first dialog screen 31A, a second dialog screen 32 as illustrated in FIG. 5C is displayed. When a touch operation is performed on a Yes button 321 on the second dialog screen 32, the step "ST002" selected by the touch operation by the operator serves as the initial point of the reactivation, similarly to the first embodiment.

According to the second embodiment described above, by performing a touch operation on the first dialog screen 31A, the programmable controller 10 can individually execute the control process of the step selected by the operator, so that convenience for the operator increases and troubleshooting can be performed efficiently.

Next will be described a third embodiment of the present invention with reference to FIG. 9. The present embodiment is different from the second embodiment in that an individual operation button indicative of a reverse operation of a selected step is further added to the first dialog screen 31A that has been described in the second embodiment, so that the reverse operation is performable. Here, the reverse operation indicates an operation reverse to a control process of a selected step. For example, a reverse operation of a forward movement instruction is a rearward movement instruction, and a reverse operation of a clamp operation instruction is an unclamping operation instruction.

In the following description, an individual operation button that causes a programmable controller 10 to individually execute a control process of a step selected by an operator is assumed a first individual operation button, and an individual operation button that causes the programmable controller 10 to individually execute a reverse operation to the above operation is assumed a second individual operation button.

Figure 9:
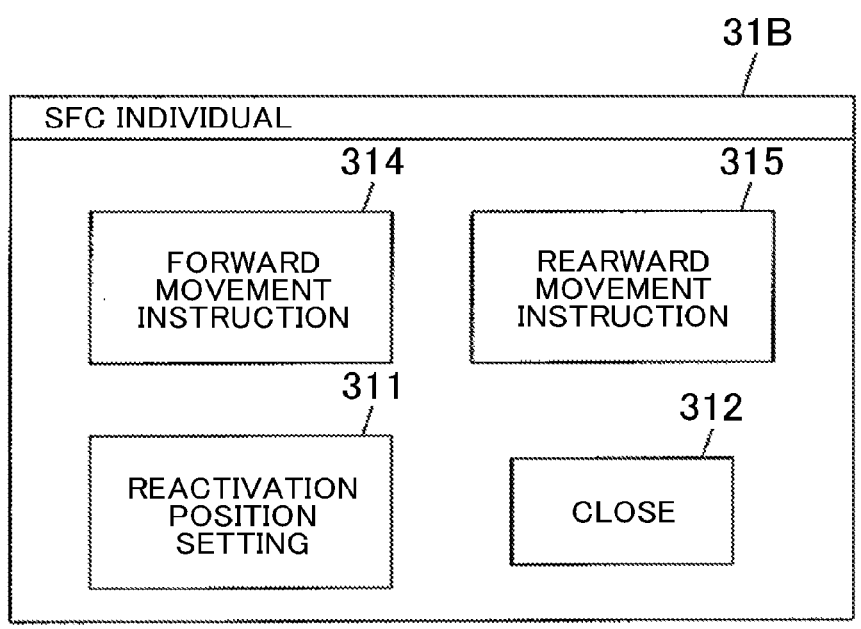
FIG. 9 illustrates a first dialog screen displayed on a display of a monitoring device according to a third embodiment of the present invention.

FIG. 9 illustrates a first dialog screen 31B displayed on a display 21 of a monitoring device 2 according to the present embodiment. The first dialog screen 31B is displayed in the following case: the operator performs troubleshooting at the time when troubles occur during an automatic operation of a facility 12 in which the programmable controller 10 continuously executes a SFC program as illustrated in FIG. 3; the operator turns on a power supply of the programmable controller 10 again; and after that, the operator performs a touch operation on a display area of a step "ST002" on the display 21.

On the first dialog screen 31B, a first individual operation button 314 that causes the programmable controller 10 to execute a forward movement instruction, which is a control process of a step "ST002," and a second individual operation button 315 that causes the programmable controller 10 to execute a rearward movement instruction, which is a reverse operation to the forward movement instruction, are displayed in addition to a reactivation position setting button 311 and a close button 312 as described in the first embodiment.

A display content of the first individual operation button 314 includes a text string "forward movement instruction" indicative of a content of the control process of the step "ST002," and a display content of the second individual operation button 315 includes a text string "rearward movement instruction" indicative of the reverse operation to the control process of the step "ST002." Note that a reverse operation of each step is set as a parameter of an operation program in advance.

When a touch operation is performed on the first individual operation button 314 on the first dialog screen 31B, a controlling portion 20 of a monitoring device 2 operates similarly to the second embodiment. In the meantime, when a touch operation is performed on the second individual operation button 315 on the first dialog screen 31B, the controlling portion 20 of the monitoring device 2 changes the display content of the second individual operation button 315, so as to clearly notify the operator that the touch operation is received effectively. Further, the controlling portion 20 sends, to the programmable controller 10, a signal indicating that the touch operation has been performed on the second individual operation button 315. These processes are processes executed by the controlling portion 20 as a receiving portion 202.

In this state, when the operator performs a push operation on an execution switch 134 of an operating panel 13, the rearward movement instruction, which is a reverse operation to the control process of the step "ST002," is executed by the programmable controller 10.

By the execution of the reverse operation, the facility 12 enters a state before the control process of the step "ST002" selected by the touch operation of the operator is executed, that is, a state in which a control process of a step "ST001," which is one upstream step before the step "ST002," is executable. Here, the controlling portion 20 serves as the receiving portion 202 and regards that the step "ST001" is selected as a step serving as an initial point of reactivation. This measure is intended to increase certainty of an automatic operation of the facility 12 after the reactivation. That is, by the execution of the reverse operation, the automatic operation of the facility 12 can be started also from the step "ST002" at the time of the reactivation. However, by starting the automatic operation of the facility 12 after the reactivation from the step "ST001," which is one upstream step before the step "ST002," control processes of the step "ST002" and its subsequent steps can be performed after a workpiece is surely clamped, for example, thereby making it possible to increase certainty of the automatic operation of the facility 12.

Further, in order for the programmable controller 10 to restart the execution of the control processes from the step "ST001," the controlling portion 20 functions as a change instruction generation portion 203 and generates, to the programmable controller 10, a change instruction to turn an execution flag of the step "ST001" into 1 (ON) and to turn an execution flag of the step "ST002" into 0 (OFF). Hereby, at the time of reactivation after halfway stop of the facility 12, the execution of the control processes by the programmable controller 10 is restarted from the step "ST001."

According to the third embodiment described above, by performing a touch operation on the first dialog screen 31B, the programmable controller 10 can individually execute the control process of the step selected by the operator or the control process of its reverse operation, so that convenience for the operator increases and troubleshooting can be performed more efficiently.

The present invention has been described based on the first to third embodiments, but the embodiments described above do not limit the invention according to Claims. Further, it should be noted that all combinations of features described in each of the embodiments may not necessarily be essential to the means for solving the problem of the invention.

Further, the present invention can be carried out with various modifications within a range that does not deviate from the gist of the present invention. For example, each of the above embodiments deals with a case where the monitoring device 2 is provided in the operating panel 13. However, the present invention is not limited to this. The operation program editing device 11 (see FIG. 1) may have a function like the controlling portion 20 of the monitoring device 2, for example, so that the operation program editing device 11 may be used as a monitoring device.

What is claimed is:

1. A monitoring device for a programmable controller, the monitoring device being configured to display, on a display device, an operation state of the programmable controller configured to execute a program described to include a plurality of steps each indicative of an individual control process and a transition indicative of a transition condition between the plurality of steps, the monitoring device being comprising:
  a display portion configured to read states of execution flags stored in the programmable controller as flags indicative of respective execution states of the plurality of steps and to display, on the display device, a step that is being executed by the programmable controller among the plurality of steps in such a manner that the step is distinguishable from the other steps;
  a receiving portion configured to receive selection of a step serving as an initial point of reactivation from among the plurality of steps in a case where halfway stop occurs during a continuous operation in which control processes of the plurality of steps are continuously executed by the programmable controller from an upstream side to a downstream side; and
  a change instruction generation portion configured to generate, to the programmable controller, a change instruction to change the states of the execution flags in order to cause the programmable controller to restart the execution of the control processes from the step received by the receiving portion, at a time of the reactivation.

2. The monitoring device for the programmable controller, according to claim 1, wherein:
  the program includes a branch circuit that is able to execute the control processes of the plurality of steps in parallel, and a first merged circuit that merges execution process paths for the plurality of steps, the execution process paths being branched by the branch circuit; and
  in a case where the halfway stop occurs on an upstream side relative to the branch circuit and the step received by the receiving portion is included in any one of the plurality of execution process paths branched by the branch circuit, the change instruction generation portion generates, to the programmable controller, a change instruction to change the states of the execution flags so as to execute, in addition to the step received by the receiving portion, control processes of initial steps of the other execution process paths except the any one of the plurality of execution process paths branched by the branch circuit, at the time of the reactivation.

3. The monitoring device for the programmable controller, according to claim 2, wherein:

the program includes a selective branch circuit that is able to execute the control processes of the plurality of steps selectively, and a second merged circuit that merges execution process paths for the plurality of steps, the execution process paths being branched by the selective branch circuit; and in a case where the halfway stop occurs on a downstream side relative to the second merged circuit, the receiving portion disallows selection of a step that has not been executed before the occurrence of the halfway stop, from among a plurality of steps between the selective branch circuit and the second merged circuit.

4. The monitoring device for the programmable controller, according to claim 1, wherein:

when one of the plurality of steps is selected in a state where a continuous operation of the plurality of steps by the programmable controller stops halfway, the receiving portion displays a dialog screen configured to receive an individual operation of causing the programmable controller to execute a control process of the step thus selected; and when the control process is executed by the individual operation, it is regarded that a step that is one downstream step after the step thus selected, among the plurality of steps, is selected as the step serving as the initial point of the reactivation.

5. The monitoring device for the programmable controller, according to claim 4, wherein:

the receiving portion displays, on the dialog screen, a first button indicative of an operation of the control process of the step thus selected and a second button indicative of a reverse operation to the control process of the step thus selected; and when the second button is operated so that the reverse operation is performed by the programmable controller, it is regarded that a step that is one upstream step before the step thus selected, among the plurality of steps, is selected as the step serving as the initial point of the reactivation.

* * * * *